July 24, 1951 S. F. CLARK 2,562,017
ACCELERATOR LOCKING ASSEMBLY
Filed Oct. 12, 1949
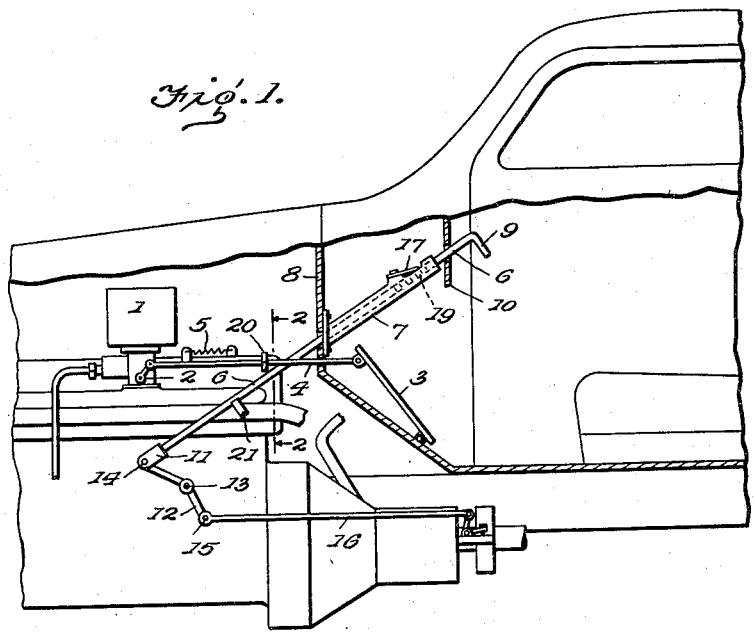
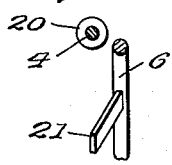
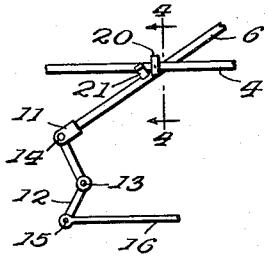
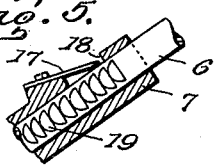
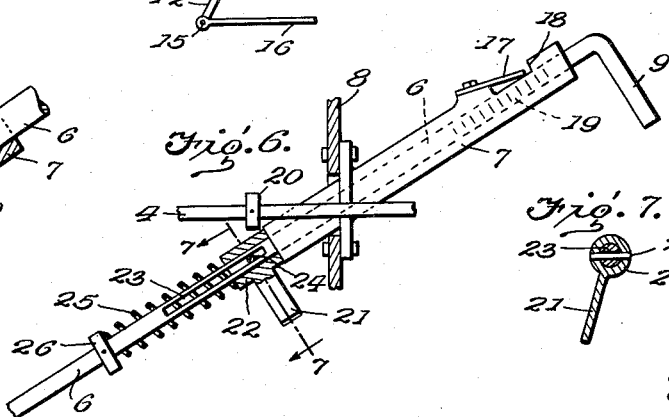
Inventor
S. F. Clark,
By Baldwin, Wight & Prevost,
Attorneys Patented July 24, 1951

2,562,017

UNITED STATES PATENT OFFICE 2,562,017

ACCELERATOR LOCKING ASSEMBLY

Shirley F. Clark, Manning, Iowa

Application October 12, 1949, Serial No. 120,937

5 Claims. (Cl. 192—3)

1

My invention consists in new and useful improvements in a brake controlled accelerator lock for motor vehicles and has for its object to provide a device of this character which will prevent the depression of the accelerator and hence, the operation of the motor vehicle, while the emergency brake is locked in engaged position. In the past, considerable damage to brake linings and drums has been incurred due to the operation of a motor vehicle even for short distances, when the emergency brake has inadvertently been left in set position and, with my improved arrangement, this possibility is completely avoided.

Another object of my invention is to provide an accelerator lock assembly which is inexpensive and extremely simple in construction and installation, its principle of operation being readily adaptable to motor vehicles embodying various types and locations of emergency brake equipment.

A still further object of my invention is to provide an accelerator lock which involves a minimum of working parts, which insures positive action and naturally reduces maintenance and repair costs.

With the above and other objects in view, which will appear as the description proceeds, my invention consists in the novel features herein set forth, illustrated in the accompanying drawings and more particularly pointed out in the appended claims.

Referring to the drawings in which numerals of like character designate similar parts throughout the several views:

Figure 1 is a view in side elevation, showing a motor vehicle partly broken away to illustrate an adaptation of one form of my invention;

Figure 2 is an enlarged fragmentary section taken on line 2—2 of Figure 1, illustrating the accelerator rod abutment and locking arm in non-engaging position;

Figure 3 is a fragmentary view in side elevation, showing the locking arm in line for engagement by the abutment on the accelerator rod;

Figure 4 is a sectional view taken on line 4—4 of Figure 3, showing the locking parts in engaging position;

Figure 5 is an enlarged sectional detail of one form of pull rod locking means which may be employed in connection with my invention;

Figure 6 is an enlarged view partly in side elevation and partly in section, showing a modified form of accelerator locking device constructed in accordance with my invention, and Figure 7 is a sectional detail taken on line 7—7 of Figure 6.

In the drawings, referring first to Figure 1, I have shown more or less diagrammatically, the body of a conventional motor vehicle having a carburetor 1 and carburetor control valve lever 2, operatively connected to the foot accelerator pedal 3 by the accelerator rod 4, the usual spring means 5 being employed for returning the carburetor control lever to closed or inoperative position. In the particular form illustrated, the emergency brake consists of a pull rod 6 which is slidably mounted in a housing 7, rigidly secured to the dash 8 of the motor vehicle with its angular handle 9 projecting through an opening in the instrument board 10. The opposite end of the pull rod 6 extends through the dash 8 and terminates under the hood, where it is connected by a swivel joint 11 to the brake operating lever 12. The brake operating lever 12 is centrally pivoted at 13 and its opposite ends are pivotally connected at 14 and 15 to the swivel joint 11 and the brake rod 16, respectively. The brake equipment per se, functions in any conventional manner and forms no part of my invention.

The emergency brake control 6, illustrated in the drawings, is of the type which is adapted to be pulled rearwardly through the instrument board and rotated by the handle 9 for setting the brakes. Although various means may be employed for retaining the pull rod 6 in brake-setting position, I have shown in the drawings one form which has proven satisfactory. As will be seen from Figure 5, this locking means consists of a spring strip 17 bolted or otherwise rigidly secured at one end to a thickened portion of the housing 7, with its free end projecting into a slot or opening 18 in the housing, in tensioned engagement with the periphery of the pull rod 6. On one side of the pull rod, I provide a series of teeth or indentations 19 which, when the pull rod is rotated clockwise (in Figure 5), will be operatively engaged by the projecting end of the spring strip 17, to lock the pull rod in brake setting position. Upon turning the pull rod in a counterclockwise direction, the teeth 19 are disengaged and the smooth surface of the periphery of the rod engages the spring strip, permitting the release of the emergency brake.

Returning now to the accelerator locking assembly, the embodiment illustrated in Figures 1 to 4 comprises an abutment 20 which may be in the form of a collar fixed to the accelerator rod 4 or may be formed integral therewith so as to move longitudinally with the accelerator rod upon the depression of the foot accelerator 3. It will be seen from the drawings that the lower end of the pull rod 6 intersects the plane of the accelerator rod 4 at a point intermediate its ends, and fixed to the pull rod is a radially extending locking arm 21 which moves longitudinally with the pull rod and is rotatable thereby into and out of line for locking engagement by the abutment 20. Thus, when the pull rod 6 is drawn a predetermined distance inwardly through the instrument board, the locking arm 21 is moved longitudinally therewith, to a position laterally adjacent the abutment 20. Upon clockwise rotation of the pull rod by the handle 9 to set the brakes, the locking arm 21 is in turn rotated into the path of movement of the abutment 20 on the accelerator rod 4. Hence, movement of the accelerator rod by depression of the accelerator pedal 3, is prevented. The return of the pull rod 6 to its former position automatically releases the engagement of the arm 21 and abutment 20.

The modified form of accelerator locking device illustrated in Figure 6, is basically the same as that just described. However, instead of being fixed with respect to the pull rod 6, the locking arm 21 is slidably mounted on the pull rod by means of an integral sleeve or collar 22. The rod 6 is longitudinally slotted as at 23 to receive a cross pin 24, extending through the sleeve 22 whereby the sleeve and locking arm are permitted to move longitudinally with respect to the pull rod but relative rotation thereof is prevented by engagement of the cross pin in the slot. A coil spring 25 encircles the pull rod 6 between a collar 26 fixed on the rod, and the adjacent end of the sleeve 24, which maintains the locking arm assembly 21, 22 at a point laterally adjacent the abutment 20 at all times, regardless of the longitudinal position of the pull rod in the housing 7. However, so long as the pull rod remains in the released position shown in Figure 6, that is, after counterclockwise rotation thereof, the movement of the accelerator rod 4 is unimpeded by the arm 21. Clockwise rotation of handle 9 turns the pull rod 6 and the locking arm 21 to bring the latter into the path of movement of the abutment 20 to thus prevent manipulation of the accelerator. Naturally, the reverse rotation of the pull rod releases this locking engagement.

While I have shown and described the adaptation of my invention in connection with certain specific types of emergency brake equipment, it will be apparent that by slight variations in structure and arrangement, the basic principle of my invention may be readily employed with various types of brakes and with equal effect.

From the foregoing, it is believed that my invention may be readily understood by those skilled in the art without further description, it being borne in mind that numerous changes may be made in the details of structure without departing from the spirit of the invention as set forth in the following claims.

I claim:

1. In combination with the accelerator rod of a motor vehicle and the pull rod of an emergency brake of the type adapted to be set in operative position by rotation of the pull rod; an accelerator locking assembly, comprising an abutment fixed on and movable with said accelerator rod, and a locking arm carried on and rotatable by said pull rod for projection into and retraction from the path of movement of said accelerator rod abutment, said arm being positioned on said pull rod for retraction from the path of said abutment when the pull rod is rotated for release and to rotate with the pull rod into engaging position when the pull rod is rotated to set the brakes.

2. In combination with the accelerator rod of a motor vehicle and the pull rod of an emergency brake of the type adapted to be set in operative position by rotation of the pull rod; an accelerator locking assembly comprising an abutment fixed on and movable with said accelerator rod, and a radially extending locking arm carried on and rotatable with said pull rod for projection into and retraction from the path of movement of said accelerator abutment, said arm being positioned on said pull rod for retraction from the path of said abutment when the pull rod is rotated for release and to rotate with the pull rod into engaging position when the pull rod is rotated to set the brakes.

3. In combination with the accelerator rod of a motor vehicle and the pull rod of an emergency brake of the type adapted to be set in operative position by rotation of the pull rod; an accelerator locking assembly comprising an abutment fixed on and movable with said accelerator rod and a radially extending locking arm mounted on said pull rod and capable of longitudinal sliding movent with respect thereto, means normally retaining said arm in a longitudinal position on said pull rod, loaterally adjacent said abutment, and means keying said arm to said pull rod for rotation therewith, whereby said arm is projected into and retracted from the path of movement of said abutment, upon rotation of said pull rod to respectively set and release said brakes.

4. The combination as claimed in claim 3 wherein said locking arm is slidably retained on said pull rod between a stationary abutment and a coil spring, one end of said coil spring being fixed with respect to the pull rod with its other end intensioned engagement with said locking arm.

5. The combination as claimed in claim 3 wherein said locking arm is mounted on said pull rod by means of a collar which slidably embraces the latter, said pull rod being longitudinally slotted for cooperation with a transverse key-pin extending through said collar, to cause rotation of the arm with the pull rod.

SHIRLEY F. CLARK.

REFERENCES CITED

The following references are of record in the file of this patent:

UNITED STATES PATENTS

| Number | Name | Date |
| --- | --- | --- |
| 2,229,056 | Dick | Jan. 21, 1941 |